R. A. BECKER.
ELECTRICAL GROUNDING DEVICE.
APPLICATION FILED NOV. 27, 1916.

1,290,881.

Patented Jan. 14, 1919.
3 SHEETS—SHEET 1.

Inventor
Robert A. Becker,

Witnesses
Thos. Freeman.
Douglas Leake

By J. Stuart Freeman.
Attorney

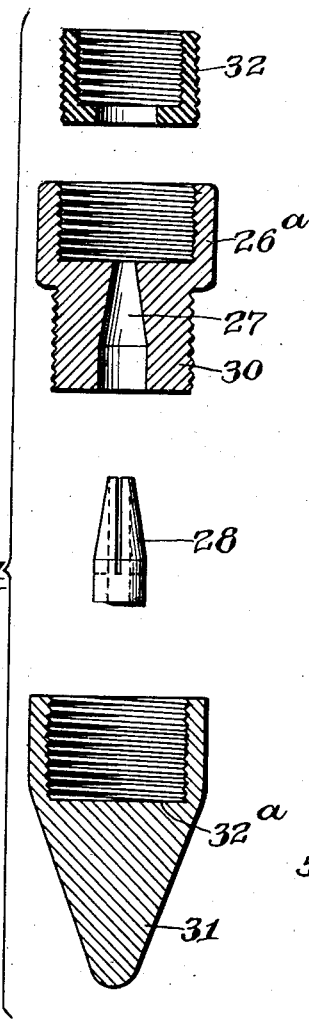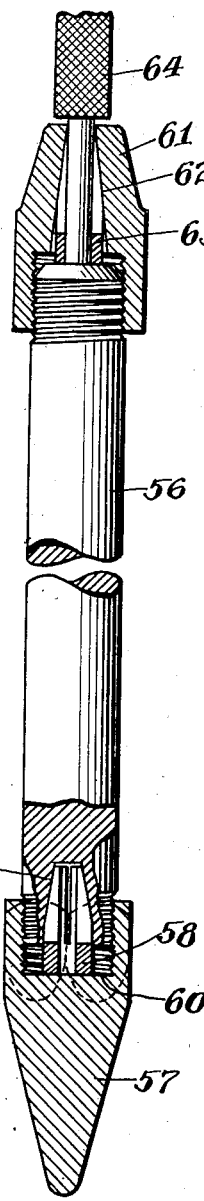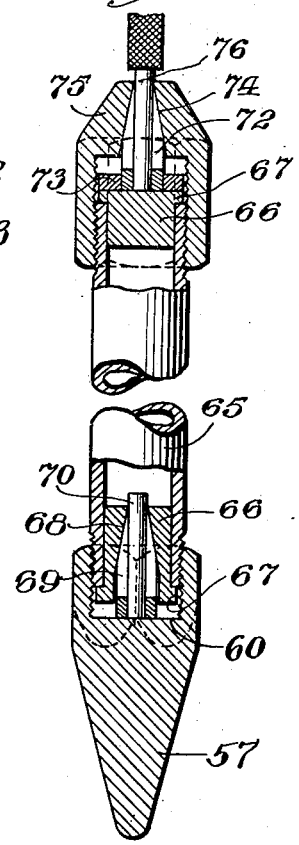

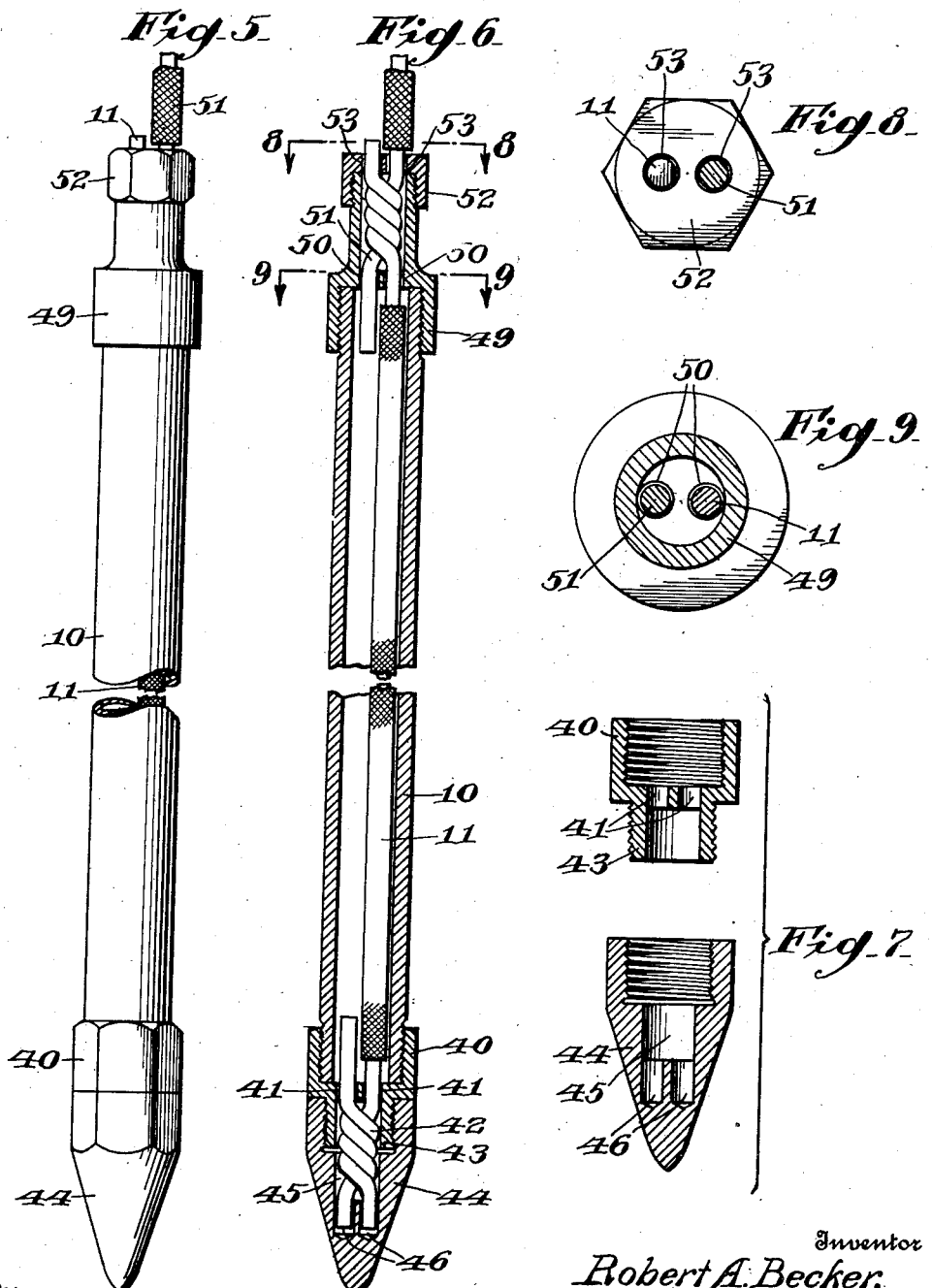

UNITED STATES PATENT OFFICE.

ROBERT A. BECKER, OF POUGHKEEPSIE, NEW YORK, ASSIGNOR TO CHARLES TREMAIN, OF POUGHKEEPSIE, NEW YORK.

ELECTRICAL GROUNDING DEVICE.

1,290,881.  Specification of Letters Patent.  Patented Jan. 14, 1919.

Application filed November 27, 1916. Serial No. 133,631.

*To all whom it may concern:*

Be it known that I, ROBERT A. BECKER, a citizen of the United States, residing at Poughkeepsie, in the county of Dutchess and State of New York, have invented certain new and useful Improvements in Electrical Grounding Devices, of which the following is a specification.

The object of the invention is to provide an improved device for "grounding" electric conductors, to safely convey below the surface of the earth electrical discharges passing off from lightning arresters, as well as for providing an efficient return for the current on one side of an electric transmission system, and for similar conditions in which an earth connection offering low resistance is demanded.

Another object is to provide such a device of the "pointed" type adapted to be driven into the earth in combination with a simple and efficient means of high conductivity for connecting electrical conductors thereto.

Still another object is to provide a device of this character comprising a hollow pipe or tube, a pointed member secured to one end thereof, means secured to the opposite end of said pipe for securing an electrical conductor to the device as a whole and simultaneously closing the adjacent end of the pipe, and simple means for securing an end of said conductor extending within said pipe to said pointed member.

And a still further object is to provide such a device in which the pipe is insulated from the conductor and ground point, making physical contact with the same entirely harmless even in extreme conditions with currents of high tension and the existence of a perfect ground for the body in contact with the pipe.

Figure 1:
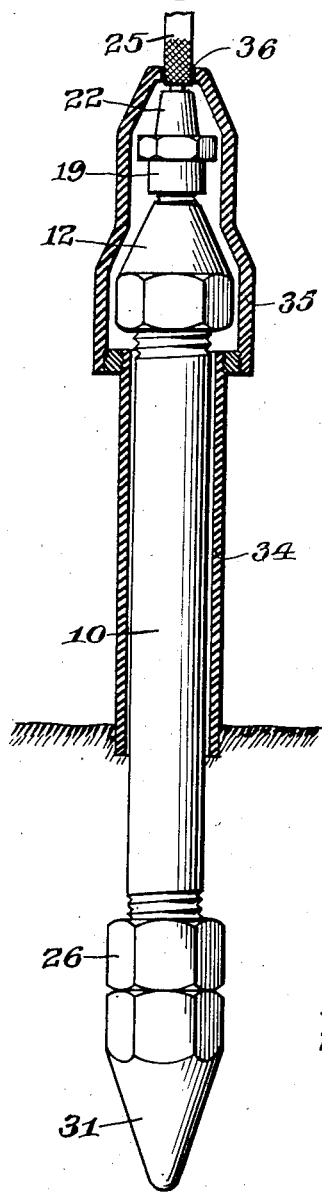
Figure 2:
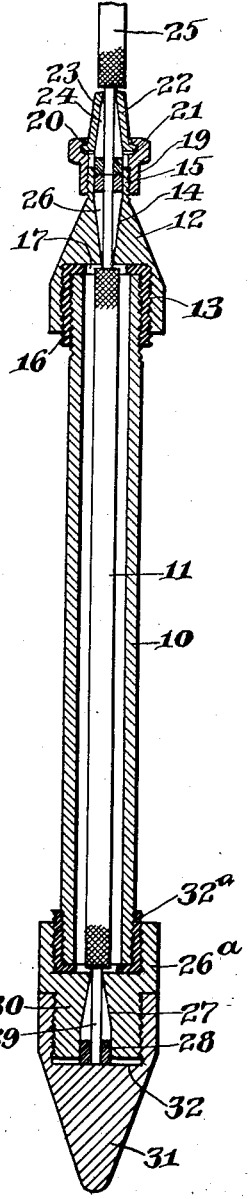
Figure 3:
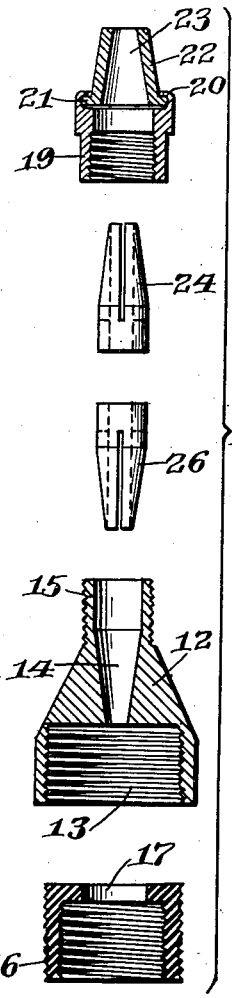

Further advantages and details in the construction of the present invention are fully brought out in the following description, when read in conjunction with the accompanying drawings, in which Figure 1 is an elevation of one embodiment of the invention; Fig. 2 is a longitudinal diametrical section of the same; Fig. 3 is a collective view of the elements forming the means for securing a conductor to the free end of a grounded pipe; Fig. 4 is a collective view of the elements forming the means for securing the conductor end to the ground point; Fig. 5 is an elevation of a modified form of the device comprising a twisted type; Fig. 6 is a diametrical section of the same; Fig. 7 is a collective view of the ground point and the adjacent member; Fig. 8 is a sectional view on the line 8—8 of Fig. 6; Fig. 9 is a section on the line 9—9 of Fig. 6; Fig. 10 is an elevation of a grounding rod partly in section; Fig. 11 is a fragmentary sectional view of a modified ground point connection from that shown in Fig. 10.

Referring particularly to Figs. 1 and 2 of the drawings, a metallic or other suitable pipe 10 is provided, having externally threaded ends and adapted to receive and protect an insulated, or other, electric conductor 11 extending therethrough and bared at its end portions.

To one end of said pipe is secured a cap 12, provided with a central aperture 13 opening into the smaller end of a tapering recess 14 passing through an externally threaded reduced extension 15 of said cap, the device preferably being provided with an insulating sleeve 16 of fibrous or similar material both internally and externally threaded and separating the said cap from said pipe. This sleeve is closed at one end and centrally apertured at 17 to permit the passage of the wire conductor therethrough.

Upon the cap extension 15 is screwed a second cap 19, having its free annular edge portion spun or die-stamped to form a flange 20 for encircling and slidably retaining the annular flanged portion 21 of a member 22, having a central tapered aperture 23 in which slides longitudinally a centrally apertured, expansible, gripping member 24, as the said cap 19 is screwed into position, said gripping member firmly securing the bared end portion of a conductor 25 by coöperation with a second gripping member 26 slidable in the recess 14 and operative to grip the upper bared end of the conductor 11. This firm coöperation of the said gripping members and the adjacent ends of the pipe-inclosed conductor and that extending to the line, operates to force the air from between the contacting surfaces, and by the great pressure produced to form a cold weld of low resistance and consequently of high conductivity.

Upon the opposite end of the said pipe is secured a cap 26ª, provided with an inwardly tapering aperture 27 within which is adapted to be forced a third tapered member 28, similar to those above described and surrounding a relatively short bared section 29 of the electric conductor 11. The lower end portion 30 of the said cap is externally threaded to receive the pointed cap 31, the recess in which terminates in a wall 32, with which the member coöperates as the two caps are screwed together, thereby firmly gripping the said conductor end 29. Between the pipe 10 and the cap 26ª is also preferably interposed an externally and internally threaded insulating sleeve 32ª of suitable material and similar to the sleeve 16.

At times, particularly when the device is liable to be subjected to high voltage, the sleeves 16 and 32ª may be omitted and instead the pipe 10 is inclosed within an insulating tube 34, to which is secured a suitably shaped cap 35 of the same material, and at its opposite end apertured at 36 to permit the passage of the conductor 25 therethrough.

With this construction a "ground" wire is carried along the side of a building, pole, or the like, to the device hereinbefore described and, with an end and intermediate section thereof bared of the insulation, it is secured in position as shown by firmly screwing the respective caps and gripping members into place. When thus assembled, the pipe is insulated from the conductor, and the gripping means, secured to the upper end thereof though electrically charged may be protected by a suitable sectional insulating shell, in such manner as to protect persons or animals coming into contact therewith.

While the foregoing describes a pointed grounding device to which the electric conductor is secured by plug gripping members, Figs. 5 and 6 illustrate a modified form of the device to which the conductor is secured, by twisting together with a short piece of the same material. To the lower end of the usual pipe 10 is screwed a cap 40 provided with an oval, or two circular, apertures 41 through which extends one bared end of the insulated conductor 11 from within the pipe and the end portion of a short bare section 42 of a similar electric conductor. Upon the lower reduced end portion 43 of the said cap is screwed a pointed cap 44, having a central recess 45 terminating inwardly in a pair of recesses 46. Into each of these latter recesses the respective free ends of the two conductors are inserted and the last-named cap revolved into place, thereby twisting said conductors together as shown. This provides a second method of positively securing a conductor to a ground point and insures a positive and unyielding coöperation between the respective parts, automatically locking said parts against accidental loosening, and forming a cold weld by drawing the wires together in such manner as to force all air from between them.

The upper connecting means may be formed in a similar manner, comprising essentially a pipe cap 49, provided with apertures 50 to receive the conductor and one end of a section of conductor 51. Upon the said cap is screwed a second cap 52, also provided with holes 53, through which also pass the said conductor and section, the result being that, by the revolving of the cap upon the other with the said conductors held firmly by each, the latter are securely twisted together and form a bond of the most positive character.

Many conditions characteristic of certain kinds of installations require a solid grounding member such as a bar instead of a pipe or inclosed conductor. Such a device is shown in Fig. 10, wherein a rod 56 is capped at one end by a pointed member 57 threaded thereon and preferably locked or bound against loosening by the wedge-shaped member 58, entering the tapering recess 59 in said bar and abutting at its other end the inner wall 60 of the cap recess. To the opposite end of said bar is threaded a hollow member 61, having an outwardly tapering aperture 62 in which is slidably movable a centrally apertured yielding member 63, surrounding and securely gripping the bared end portion of an electrical conductor 64 by coöperation with the end of the said bar or rod.

In Fig. 11 is shown a form of the device comprising a pipe 65 in the opposite ends of which fit solid members 66 prevented from wholly entering said pipe by an annular flange 67, one of said members being provided centrally with an inwardly tapering aperture 68 into which is forced a tapering plug 69, surrounding a short piece of wire 70, by contact with the wall 60 of the pointed head 57. Against the other member 66 a tapering member 72, surrounded by a washer 73, coöperates with the sides of a tapering bore 74 in the pipe cap 75 to grip and firmly secure one bared end of an electric conductor 76.

Having thus described my invention, what I claim and desire to protect by Letters Patent of the United States is:—

1. A grounding device, comprising a tube, a head secured to one end thereof, a member secured to the other end thereof, electric insulating material interposed between said tube and each of said head and said member, and an electric conductor electrically connecting said head and said member and insulated from said tube.

2. A grounding device, comprising a tube, a head secured on one end thereof, means to secure an electric conductor to said head, a member secured to and inclosing the other end of said tube, means to secure said conductor to said member, said conductor extending through and insulated from said tube, and insulating means interposed between said tube and each of said head and said member.

3. A grounding device, comprising a tube, an electric conductor extending therethrough and insulated therefrom, a cap on one end of said tube and insulated therefrom, a second cap on the other end of said tube and insulated therefrom, and each being provided with a tapering aperture, yielding gripping means within said apertures, a pointed head operative to contract one of said means about an end of said conductor as it is screwed into place, an apertured head operative to contract the other of said means about the other end of said conductor, a third yielding means slidable within said second head and coöperative with the adjacent one of said first gripping means to grip and removably secure to the device a second electric conductor.

4. A grounding device, comprising a member adapted to be grounded, a hollow cap adapted to be secured thereto and provided with a radially and reversely inwardly directed flange, a second member provided with a tapered bore and having a portion in slidable engagement within said flange, a yielding member slidable within said first member and operative to grip and secure an electric conductor, as said cap is screwed upon said first-named member.

5. A grounding device, comprising a rod or tube, a hollow cap adapted to be secured thereto and provided with a radially directed flange, a member provided with a tapered bore and having a portion in slidable engagement with said flange, said member being movable relative to said cap as the latter is revolved upon the end of said rod or tube and a tapered member slidable within said bore and adapted to grip an electric conductor as said gripping member is forced through said bore by screwing said cap upon said rod or tube.

In testimony whereof I have affixed my signature in presence of two witnesses.

ROBERT A. BECKER.

Witnesses:
LAURENCE E. SHERWOOD,
ANNA G. W. DAYLEY.